Aug. 4, 1953  D. J. HINMAN  2,647,555
METHOD AND APPARATUS FOR SPLICING
Filed Dec. 12, 1950  4 Sheets-Sheet 1

INVENTOR.
DORR J. HINMAN
BY James J. Long
AGENT.

Aug. 4, 1953 D. J. HINMAN 2,647,555
METHOD AND APPARATUS FOR SPLICING
Filed Dec. 12, 1950 4 Sheets-Sheet 2

INVENTOR.
DORR J. HINMAN
BY James J. Long
AGENT.

Aug. 4, 1953  D. J. HINMAN  2,647,555
METHOD AND APPARATUS FOR SPLICING
Filed Dec. 12, 1950  4 Sheets-Sheet 3
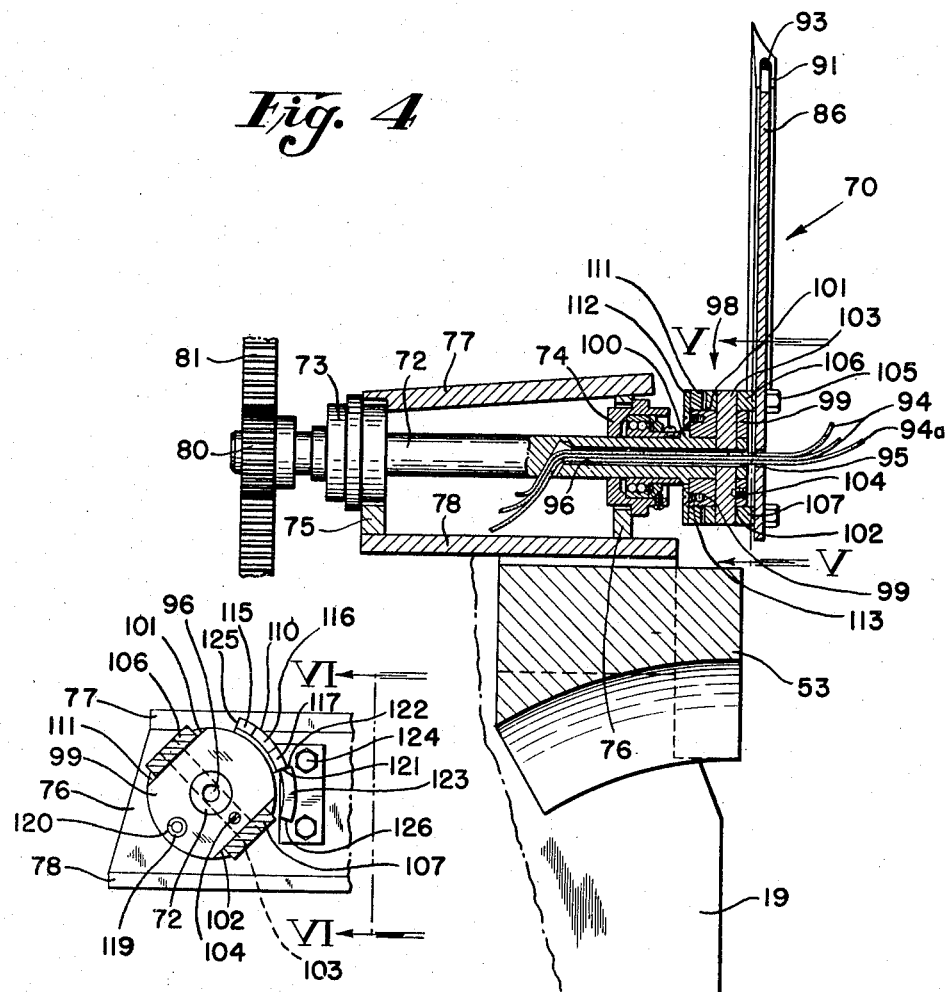
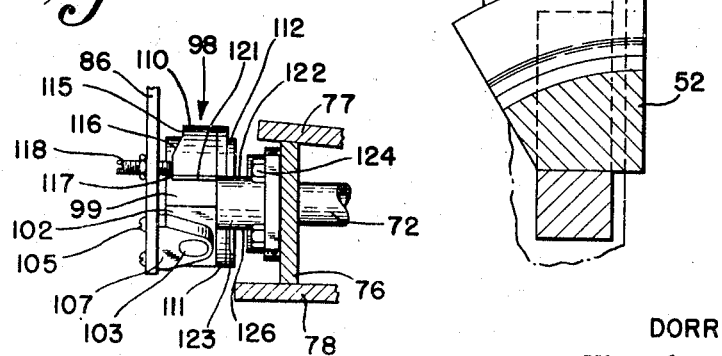
INVENTOR.
DORR J. HINMAN
BY James J. Long
AGENT.

Aug. 4, 1953  D. J. HINMAN  2,647,555
METHOD AND APPARATUS FOR SPLICING
Filed Dec. 12, 1950  4 Sheets-Sheet 4

INVENTOR.
DORR J. HINMAN
BY James J. Long
AGENT.

UNITED STATES PATENT OFFICE 2,647,555

METHOD AND APPARATUS FOR SPLICING

Dorr J. Hinman, Detroit, Mich., assignor to United States Rubber Company, New York, N. Y., a corporation of New Jersey Application December 12, 1950, Serial No. 200,462

17 Claims. (Cl. 154—9)

This invention relates to an improved method and apparatus for splicing, and more particularly it relates to improved splicing of tubes of uncured rubber stock, especially butyl rubber, to form annular objects such as curing bags or inner tubes.

In the manufacture of pneumatic tire casings, it is conventional to build the raw tire casing in the form of a generally flat annular band, and to shape such band in annular toroidal form with the aid of an inflatable "curing bag" or "water bag," which is a hollow annular tube resembling an inner tube, but having relatively thick walls. The external contour of the curing bag corresponds to the desired internal contour of the pneumatic tire. The curing bag is disposed within the raw pneumatic tire casing, and is filled with a heated fluid medium under pressure to apply internal pressure to the tire casing in the heated mold in which the tire is vulcanized, thereby making the tire casing conform to the walls of the mold cavity. The bag also serves to supply internal heat to the tire during the vulcanizing operation, so that the vulcanization is effected more rapidly and more uniformly. After the tire is vulcanized the curing bag is removed therefrom and used over again. This cycle is repeated until the curing bag deteriorates from repeated exposure to high temperatures and from the rough handling to which the bag is subjected when it is inserted in, or removed from, the tire casing, such insertion and removal operations requiring extreme twisting and rough pushing or pulling of the bag.

Because of the unusually severe service to which the curing bag is subject, it is necessary that the bag be strong, and resistant to repeated exposure to vulcanizing conditions. For this reason it is preferred to make a curing bag of a synthetic rubber composition of the type known as butyl rubber, that is, a rubbery copolymer of isobutylene with a diene such as butadiene or isoprene. Such synthetic rubber has superior resistance to oxidation and reversion at elevated temperatures, and therefore curing bags made from this material have relatively long service life.

One method of making the curing bag involves extruding raw rubber stock, usually butyl rubber, in the form of a tube having the desired cross sectional contour, cutting such tube into suitable lengths and splicing the ends of the tube, preferably by a butt splice, to form an annular toroidal shape which is then vulcanized in a mold to form the completed bag. The methods and apparatus conventionally employed for making the splice in the curing bag have not been entirely satisfactory. A principal objection to the conventional splicing operation is that it frequently leaves appreciable bulges or thick portions on the interior surface of the bag adjacent the line of splice. The bulges limit heat transfer from the bag to the tire casing in the vulcanizing operation, requiring a longer curing period in local areas, or resulting in locally under cured portions in the tire in the neighborhood of the bulges.

The difficulties in making a proper splice in the curing bag are aggravated by the relatively great thickness of the walls of the bag, which makes it difficult to cut off the end surfaces of the bag cleanly and smoothly flush preparatory to bringing them together. The thickness and relative rigidity of the walls of the bag also makes it difficult with conventional splicing apparatus to move the end surfaces of the bag toward one another to make the splice, because in conventional apparatus such movement requires the bag to be deformed circumferentially into more or less egg shape and such deformation gives rise to a tendency for the ends of the bag to be displaced from proper splicing relationship. Such deformation is especially pronounced and gives rise to particular difficulty when the bag is of small rim diameter. Also, the inherent physical properties of the raw butyl rubber stock make it difficult to bring the end surfaces of the tube into proper receptive condition for formation of a strongly knit, firm splice, free from weak spots at the line of splice, and free from bulges.

Accordingly, it is a principal object of the invention to provide a method and apparatus for making uniform, strong splices in tubes made of uncured rubber stock.

Another object is the provision of an improved apparatus for making an even, smooth cut in the end surfaces of a tube of raw rubber stock, preparatory to butt splicing such end surfaces to form a curing bag.

A further object is to provide a splicing apparatus capable of bringing the end surfaces of a relatively thick rigid tube into proper butting relationship without displacement or slippage of such ends from their proper position.

Still another object is to provide an improved method of making the end surfaces of a raw butyl rubber tube, from which a curing bag or inner tube is to be formed, properly soft and receptive for the splicing operation.

The manner in which the invention accomplishes the foregoing objects, as well as other objects and advantages, will be made evident in the following detailed description, which is intended to be read with reference to the accompanying drawings, wherein:

Fig. 4 is a fragmentary front elevational view on a larger scale showing the cutting portion of the apparatus with parts broken away and parts taken in section along the line 4—4 of Fig. 2, and showing the jaws for clamping the tube in an open position;

Fig. 5 is a fragmentary side elevational view of the apparatus showing a portion of the cutting means taken along the line 5—5 of Fig. 4;

Fig. 6 is a fragmentary front elevational view of the apparatus showing a portion of the cutting means, taken partly in section along the line 6—6 of Fig. 5;

Figure 1:
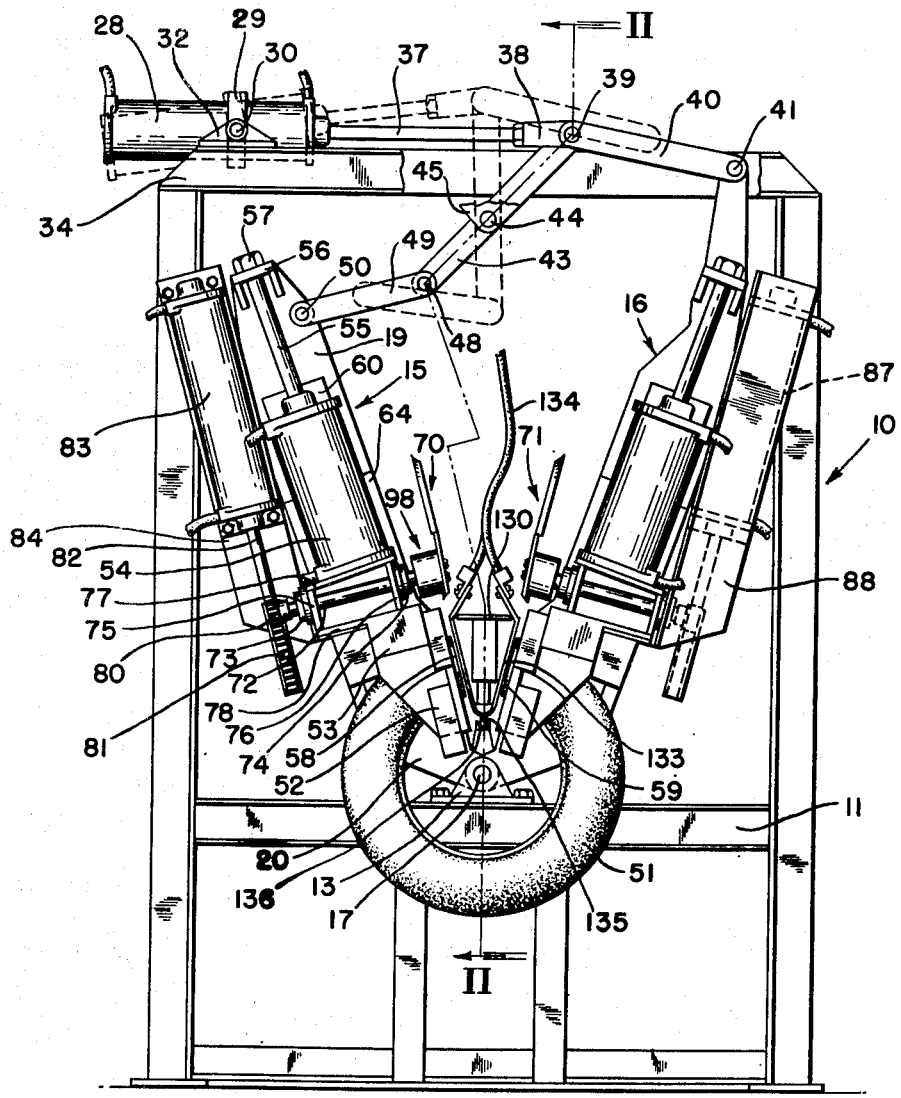
Fig. 1 is a front elevational view of an apparatus constructed according to the invention for butt splicing of curing bags in accordance with the method of the invention.

According to the invention, the tube ends which are to be spliced, such as the ends of a relatively thick walled butyl rubber tube from which a curing bag is to be made, are clamped in oppositely disposed arcuately spaced relation between suitable clamping jaws, with the ends of the tube projecting some distance outwardly from the faces of the jaws. The bulk of the excess projecting portion of each end of the tube is then cut off by means of a heated knife. This initial cut removes a relatively thick slice from the face of the tube, and the cut end surfaces of the tube are relatively curved or dished. Each end face of the tube is then cut a second time with a heated knife, the second cut removing only a very thin slice of material. As a consequence of the thinness of the second cut, the cut face of the tube is found to be exceptionally even and smooth, so that the end faces of the tube make intimate contact over their entire area when such faces are subsequently brought together for the splice.

Immediately prior to bringing the end faces together for the splice, such end faces are brought to a uniform elevated temperature, so that the surfaces will be properly soft and tacky to effect a good splice. It has been found that the end faces are most satisfactorily brought to the desired heated condition by subjecting the end surfaces to the action of relatively intense radiant heat for a brief period of time, sufficient for the surface only of the tube to be brought to elevated temperature. It is found that when the end faces of the tube are brought to the desired temperature in this manner with intense radiant heat applied for a short time, the splice which results when the end faces are pressed together is stronger and more uniform than would otherwise be possible, and the tube wall is free from excessively bulged out areas on the interior of the tube at the line of splice. This is because the application of radiant heat as described causes the outer surface only of the tube ends to be brought to splicing temperature, without excessive heating of the under surface, or of the tube itself. The elevated temperature of the surfaces permit them to be united firmly using only moderate pressure. As a result, flow of stock adjacent the splice is minimized and there is little tendency for formation of bulges on the interior wall surface of the bag.

In the preferred form of apparatus for carrying out the invention, the tube ends are arcuately spaced for the splicing operation with the length of the tube disposed in generally circular fashion, and the ends are moved together on an arcuate path having as its center the approximate center of the tube. In this way the ends are brought together without appreciable deformation of the tube from substantially circular shape, and therefore there is no tendency for the tube ends to slip, or to become displaced from proper butting relationship.

Referring to the drawings, the splicing apparatus shown therein includes a framework 10 having two horizontal longitudinally extending beams 11 and 12 (Fig. 2) which carry on their upper surfaces front and rear fulcrum members 13 and 14 respectively, that pivotally support two upwardly and angularly extending vertical swinging arm assemblies 15 and 16. The arm assemblies 15 and 16 are each joined to the fulcrum members 13, 14 by horizontal pivot pins 17 and 18 (Fig. 2) respectively, passing therethrough, and the arms are thus adapted to swing toward and away from each other in a vertical plane over an arcuate path having the pivot pins as a center.

Each swinging arm is composed of a vertical front plate 19 having a relatively narrow lower portion 20 that extends radially from the pivot pin 17. A vertical plate 21 (Fig. 2) extends at a right angle from the back face of the front plate 19, near the lower portion thereof, transversely to the rear of the framework. The plate 21 has secured to its end a downwardly extending member 22 which serves to pivotally secure the arm assembly 15 to the rear pivot pin 18. A stiffening member 23 extends upwardly along the rear face of the front plate 19 to strengthen the assembly.

For the purpose of moving the swinging arm assemblies 15 and 16 toward and away from each other, a double-acting hydraulic actuating cylinder 28 is mounted in a horizontal position on the top of the machine frame at one end thereof. The actuating cylinder 28 has secured thereto a surrounding bracket member 29, which is pivotally attached by means of a pivot pin 30 to brackets 32 and 33 secured to the upper surfaces of two spaced horizontal transverse beams 34 and 35 on top of the machine framework.

A piston rod 37 extends from the actuating cylinder 28 transversely of the machine and carries on its end a fork 38 to which there is pivotally attached, by means of a pivot pin 39, a downwardly inclined link 40 extending to the upper end of the right hand swinging arm assembly 16, and pivotally secured thereto by means of a pivot pin 41.

Another lever 43 slants downwardly from the pivot pin 39 in the opposite direction and is pivotally fulcrumed near its center on a pivot pin 44 carried by two downwardly extending brackets 45 and 46 attached to the upper beams 34 and 35 at the center of the machine. The lower end of the lever 43 is pivotally attached by means of a pivot pin 48 to a pair of links 49 which are in turn pivotally secured at their opposite ends, by means of a pivot pin 50, to the upper portion of the left hand swinging arm assembly 15.

For the purpose of clamping the ends of a raw rubber tube 51 in position for the splicing operation, each arm assembly is provided with a clamping assembly comprising a fixed lower jaw half 52 which is secured to the front face of the front plate 19 near the lower end thereof, as well as a relatively movable upper jaw half assembly 53 which is secured to the lower end of a double-acting jaw-actuating cylinder 54 that is slidably mounted on the front face of the plate 19 in a generally vertical position. A shouldered piston rod 55 extending from the upper end of the jaw-actuating cylinder 54 is secured to a horizontal bracket 56 extending outwardly from the top of the plate 19 by means of a nut 57.

The upper and lower jaws define an arcuate opening having the transverse sectional contour of the tube 51 and they are adapted to clamp the ends of the tube in arcuately spaced relation with the length of the tube in the form of a circle having the arm assembly pivot pin 17 as its approximate center. The jaws are shown in the open position in Fig. 4, preparatory to inserting therein a tube to be spliced. The tube is clamped between the jaws with the opposite ends 58 and 59 thereof projecting from the faces of the jaw assemblies.

For slidably securing the cylinder 54 and the upper jaw assembly 53 as a unit to the front plate 19, the front plate is provided with a longitudinally extending face plate 60, that is spaced from the front plate by a spacer plate 61 and is held in place on the front plate by a bolt 62 passing through the front plate and spacer plate 61 and threaded into the face plate 60. The face plate is wider than the spacer plate, thereby providing lateral recesses 63 at each side of the assembly. A sliding plate 64, which is secured to the upper part of the jaw assembly 53 is maintained against the face plate in sliding engagement therewith by lateral sliding clamping members 65 which extend into the recesses 63, and which are spaced from the sliding plate 64 by spacer strips 66, and secured by bolts 67 passing therethrough.

The foregoing arrangement of jaws and jaw actuating mechanism is duplicated on each of the arm assemblies 15 and 16.

Each arm assembly 15 and 16 also carries a rotary cutting mechanism 70, 71 adapted to make two successive cuts on the respective projecting ends 58, 59 of the tube 51. The left hand cutting mechanism 70 is carried on one end of a shaft 72 extending transversely of the arm assembly 15 and rotatably supported in spaced bearing assemblies 73, 74 carried by spacer plates 75, 76 disposed between upper and lower plates 77 and 78 of the upper jaw assembly 53. The opposite end of the cutter shaft 72 carries a pinion gear 80 that cooperates with a toothed rack 81 constituting the lower end of a piston rod 82 extending from a double-acting cylinder 83. The cylinder 83 is fixed to a supporting plate assembly 84 extending upwardly generally parallel to, and secured to, the front plate 19 of the swinging arm assembly 15, so as to move as a unit therewith when the arm assembly is swung about the pivot pin 17. The rotary cutting mechanism is actuated in either direction by upward or downward movement of the piston rod 82 by application of hydraulic pressure to either end of the double-acting cylinder 83.

Figure 2:
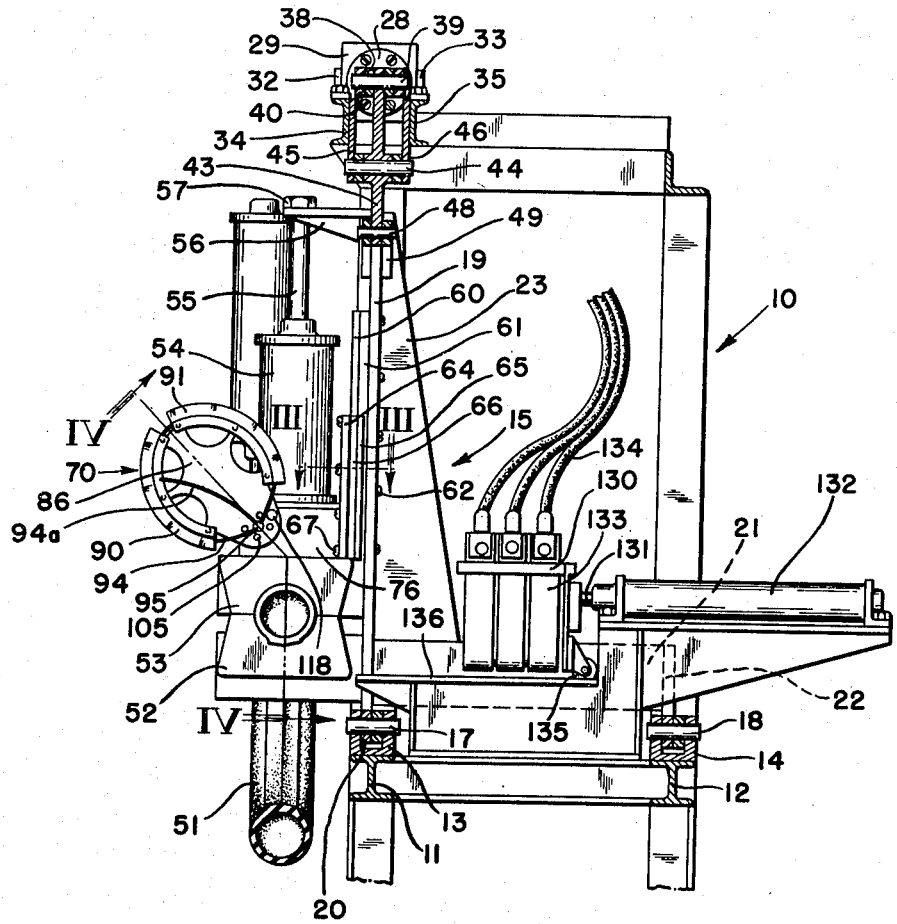
Fig. 2 is a partial side elevational view of the apparatus, taken partly in section along the line 2—2 of Fig. 1.
Figure 3:
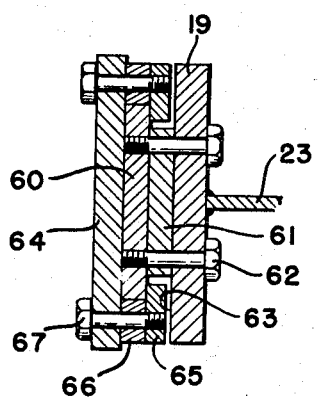
Fig. 3 is a fragmentary plan view on a larger scale of a portion of the apparatus taken in section along the line 3—3 of Fig. 2.

As will be evident from inspection of Fig. 2, the cutting mechanism 70 is mounted in a position spaced forwardly of a vertical center line drawn through the jaw assemblies, and in the neutral position the blade hub plate 86 thereof points forwardly and upwardly. The cutting mechanism 71 on the right hand swinging arm 16 is similarly constructed, but is mounted in an offset position with respect to the left hand cutting assembly 70, that is, it is located in a position spaced rearwardly of the vertical center line drawn through the jaw assemblies, and in the neutral position it points upwardly and to the rear of the machine. In this way, the respective cutting assemblies do not interfere with each other when the swinging arms 15, 16 are brought together for the splice. The cutting assemblies are essentially identical in construction and are actuated in the same manner, but the actuating cylinder 87 for the right hand cutter is mounted on the rear face of an upwardly extending supporting plate 88, which corresponds to the supporting plate 84 on the left hand side of the machine.

Figure 7:
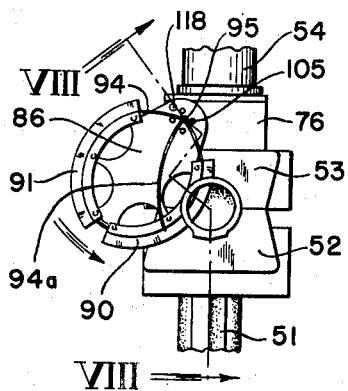
Fig. 7 is a fragmentary side elevational view of the apparatus, showing the cutting means in the process of making an initial cut.
Figure 8:
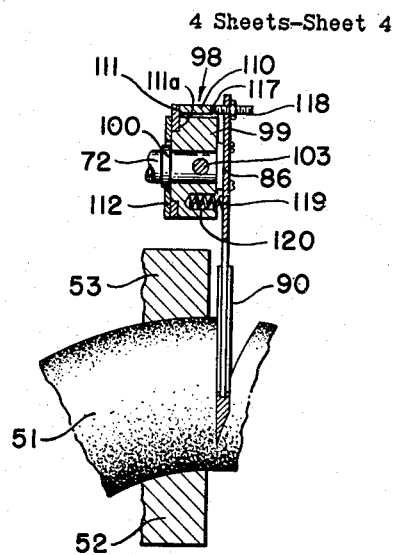
Fig. 8 is a front elevational view taken along the line 8—8 of Fig. 7.
Figure 9:
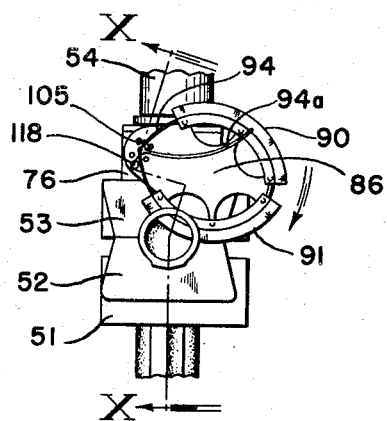
Fig. 9 is a fragmentary side elevational view of the apparatus showing the cutting mechanism in the process of making a second cut.
Figure 10:
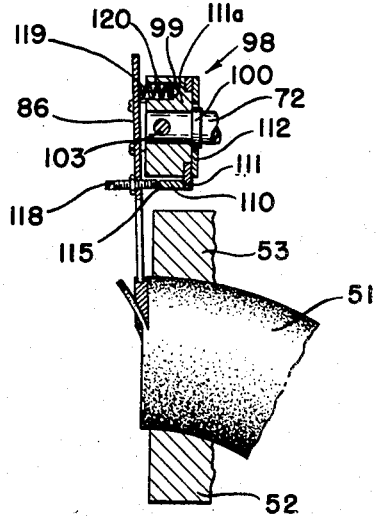
Fig. 10 is a fragmentary elevational view taken in section along the line 10—10 of Fig. 9.

The hub plate 86 of the cutter 70 is generally elliptical in form and is eccentrically mounted on the end of the shaft 72. It has a first curved cutting blade 90 secured along one portion of its periphery and a second similar blade 91 secured along the opposite portion of its periphery. Each blade has embedded therein an electrical heating element 93 (Fig. 4) which is connected to an electrical supply by insulated lead wires 94 passing through a hole 95 at the axis of rotation of the hub, and passing through an internal passageway 96 in the actuating shaft 72. A third insulated wire 94a leads to a thermocouple embedded in one of the cutting blades for use in determining and controlling the temperature thereof. The first blade 90 is utilized to make the initial cut as the cutter is rotated downwardly and inwardly of the machine, in a counter-clockwise direction as illustrated in Figs. 7 and 8, while the second blade 91 is utilized to make a second fine cut as the blade is rotated in the reverse direction, as illustrated in Figs. 9 and 10.

The spacing of the blades from the faces of the clamping jaws, and therefore the thickness of the cuts, is varied and is determined by a cam hub assembly 98 on which the blade hub plate 86 is pivotally mounted on the end of the shaft 72. The cam hub assembly 98 includes a collar 99 mounted on the end of the shaft 72 and seated against a flange 100 spaced from the end of the shaft. The collar 99 has diametrically opposed flattened portions 101 and 102 on opposite sides, and a pivot pin 103 passes through the collar and shaft, and is secured to the collar by a set screw 104 (Fig. 4) passing through the front face of the collar 99 into the pin 103. The blade hub plate 86 is secured by means of bolts 105 to bracket members 106, 107 mounted on each end of the pivot pin 103 at the flattened portions 101, 102 of the collar 99.

The blade hub plate 86 is thereby adapted to be tilted with respect to the cam hub assembly 98 about the pivot pin 103 as an axis. The angle of tilt of the blade hub 86, and therefore the spacing of the cutting blade from the faces of the clamping jaws, is determined with the aid of a cam 110 secured at the periphery of an annular cam carrier ring 111 slidably mounted in a peripheral recess 111a (Figs. 8 and 10) on the rear face of the collar 99, and retained in place thereon by an annular thrust plate 112 secured on the rear face of the collar 99 by means of screws 113 (Fig. 4) passing therethrough. The cam ring 111 normally rotates with the collar 99 and with the thrust plate 112, due to frictional engagement therewith.

The face of the cam 110 comprises a low portion 115, a slanting intermediate portion 116 and a high portion 117. One end of a cam follower 118, threaded through the blade hub plate 86, rides on the cam face as the cutter is rotated. The cam follower 118 is maintained firmly in contact with the cam face by a compression spring 119 which is disposed in a recess 120 in the face of the collar 99 located at the opposite side of the pivot pin 103 from the cam 110. The spring 119 bears against the inner face of the hub plate 86 and urges one side of the hub plate outwardly so as to cause the plate to tilt about the pivot pin 103, thereby urging the opposite side of the plate 86 and the cam follower 118 inwardly toward the cam face.

Initially the cam follower 118 is located on the high portion 117 of the cam 110. As the cutter is rotated in a counter-clockwise direction by actuating the cylinder 83 for the first cut, as shown in Figs. 7 and 8, the entire cam assembly 98, including the cam 110 itself, rotates as a unit with the cam follower 118 on the high portion 117 of the cam. Toward the end of the first cutting stroke, one side 121 (Figs. 5 and 6) of the cam 110 engages a side 122 of a fixed stop member 123, which projects outwardly from the spacer plate 76, and which is secured to the plate 76 by bolts 124. As the cam engages the stop, rotation of the cam and cam carrier ring 111 ceases, while the collar 99 and the blade hub plate 86 continue to rotate. This causes the cam follower 118 on the plate 86 to ride down the slanting portion 116 of the cam face onto the low face 115 of the cam. This movement of the cam follower onto the lower portions of the cam is accompanied by a tilting movement of the hub plate 86 about its pivotal connection 103 to the collar 99, so that the second cutting blade 91 is moved inwardly closer to the face of the cutting jaws for the second cut. The second cut is then made in a counter-clockwise direction by actuating the hydraulic cylinder 83 in the opposite direction, with the hub plate 86 and the entire cam hub assembly 98 rotating as a unit, and with the cam follower 118 now riding on the lower face 115 of the cam, as shown in Figs. 9 and 10. At the end of this second cutting stroke the opposite side 125 of the cam engages the opposite side 126 of the fixed stop 123, so that the cam and cam ring 111 are again brought to rest, and continued rotation of the remainder of the assembly causes the cam follower to return again to the high face 117 of the cam.

The blades are preferably so mounted and rotated that they cut through the stock with a slicing cut made on a substantially 30° angle. In other words, during the cut, a tangent to the path of movement of any given point on the edge of the knife blade always makes an angle of about 30° to a tangent to the edge of the blade at that point. This angle of cut has been found preferable in many instances because it leaves the end surfaces of the bag flat. If a straight cut were used it would leave the end surface dished.

The apparatus also includes a radiant heater 130 carried on the end of a piston rod 131 (Fig. 2) extending from a heater actuating cylinder 132 located toward the rear of the machine and supported in a horizontal position on the machine framework. The heater has on its face three electrical heating elements 133 to which electric current is conducted by insulated wires 134. The faces of the heater are parallel to the jaw faces and to the cut faces of the tube 51 and they are spaced in close proximity thereto. The arrangement is such that the heater 130 may be moved by the action of the cylinder 132 into position between the two clamping jaws to heat the cut end faces of the tube to proper splicing temperature, and it may then be withdrawn toward the rear of the machine, as shown in Fig. 2, before the ends of the tube are brought together for a splice. A wheel 135 attached to the lower portion of the heater aids in supporting the heater and rides in a transversely extending horizontal track 136 in the frame of the machine as the heater is moved back and forth.

In carrying out the invention for the purpose of making a curing bag, a suitable length of the raw tube 51, which is preferably made of butyl rubber stock, is placed in the recess in the lower jaws 52 of the machine, the jaws being in the open position for this purpose. The ends 58, 59 of the tube project outwardly from the surface of the jaws for a suitable distance, for example 1″. Each upper jaw 53 is then moved downwardly by application of hydraulic pressure to the jaw-actuating cylinder 54, thereby clamping the ends of the tube securely in position. When so clamped, the length of the tube is disposed in circular fashion, with the pivot pins 17, 18 as a center, and the cross-sectional shape of the tube corresponds to the finally desired shape of the curing bag.

The rotary cutting knife assemblies 70 and 71 are then actuated by applying hydraulic pressure to the respective cut-actuating cylinders 83, 87. To facilitate the cutting operation the knife blades 90, 91 of the cutter are heated to an elevated temperature by the embedded electrical heating element 93. With the usual butyl rubber stocks, knife temperatures of from 425 to 475° F. are satisfactory. The cut is easily made at these temperatures, and there is no contamination of the knife with stock.

As indicated previously, a first stroke of the rotary cutters is made to remove the bulk of the excess projecting ends 58, 59 of the tube. At the end of the first cutting stroke the cam follower 118 on the cutter hub plate 86 rides to the lower face 115 of the cam 110, thereby moving the knife blade 91 closer to the face of the clamping jaws for the return cutting stroke. The second cut removes only a very thin slice from the tube ends, for example, a slice only $\frac{1}{16}''$ thick, with the result that the end surfaces of the tube are cut perfectly smooth and flat.

The cutting mechanism is preferably so spaced from the faces of the clamping jaws that the final cut leaves approximately ¼″ of material projecting outwardly. It is found that in most instances projection of this amount of material produces optimum pressure conditions when the tube faces are subsequently butted together.

After the tube faces have been cut in this manner, the heater 130 is moved into position between the clamping jaws by application of hydraulic pressure to the heater actuating cylinder 132. When the heater is in position the surface heating elements 133 thereon are parallel to, and closely spaced from the cut faces of the tube. It has been found that the strongest and most satisfactory splice is obtained when the extreme outer surface only of the tube faces are raised to a uniformly elevated temperature over their entire surface area without appreciable heating of the under-surface of the tube. With the usual butyl rubber bag stocks, a tube surface temperature within the range of 325° to 450° F. has been found to be most satisfactory. Such elevated temperatures at the surface of the tube are obtained by suitable combination of heater surface temperature, spacing, and time of heating. The following are examples of preferred conditions which have been found to result in proper heating of the tube surfaces:

| Temperature of Radiant Heating Element (F) | 900° | 1,000° | 1,100° | 1,200° |
|---|---|---|---|---|
| Time of Heating (seconds) | 10 | 5 | 3 | 3 |
| Distance Between Heater Surface and Tube Surface (inches) | 0.06 | 0.06 | 0.06 | 0.1 |

In general, the combination of higher heater temperatures, shorter heating times, and closer spacing of the heater is preferred. Thus, for example, a heater surface temperature of 1100°, a time of heating of 3 seconds, and a spacing of 0.06 inch represent optimum conditions. It may be stated that heater temperatures in the range of from 800° to 1300° F., employed for heating times of less than 15 seconds, at spacings of less than ¼", may be made to yield satisfactory results with the usual butyl rubber stocks. It has been determined that as the heater temperature increases, it is necessary to either decrease the time of heating or increase the spacing. It is also observed that as heater temperature is decreased, the amount of bulging which occurs at the line of splice when the surfaces are subsequently brought together is greater, because a greater heating time is necessary with the lower temperatures, permitting the heat to penetrate to a greater depth from the surface of the tube.

It may be stated that as a general rule, it is preferable to heat the end surfaces at least to such temperature that when the surfaces are subsequently brought together for the splice, they are at a temperature of at least about 300° F. However, it is not essential in all cases that the surface temperature be at least 300° F., since considerable improvement in the strength of the splice, as compared to conventional cold splicing, may be obtained in some instances at temperatures appreciably lower than 300° F. Thus, a splicing surface temperature of 250° F. produced a tenfold improvement over a splice made at substantially room temperature with the same splicing pressure and splicing time. In all cases, the temperature of the splicing surface should be preferably at least 250° F. when the surfaces are brought together. However, at temperatures appreciably below 300° F., there is a tendency with certain butyl rubber stocks to form an undesirable bulge at the splice. It is therefore especially preferred in most instances to heat the splicing surfaces to at least about 325° F., so that when the surfaces are brought together for the splice, they will have a temperature of at least about 300° F. It will be understood that the surfaces will cool somewhat in the time between removal of the heater and bringing of the surfaces together.

The upper limit on the temperature to which the splicing surfaces may be heated is usually determined by the scorching temperature of the stock. With the usual stocks it is found unnecessary to heat the surface to more than 450° F. for best results, and it is usually undesirable to appreciably exceed 450° F., because of the likelihood of scorching, or pre-vulcanizing, the stock. With stocks of greater resistance to scorching, higher surface temperatures, e. g., 475° F., may be resorted to if desired, but even in such cases it will usually be unnecessary to exceed 450° F. for good results.

After the cut tube surfaces are brought to the desired splicing temperature, the heater 130 is immediately removed by actuating the cylinder 132 in the reverse direction, and the swinging arm assemblies 15 and 16 are immediately brought together by application of hydraulic pressure to the actuating cylinder 28, which swings the arms about the central pivot 17, 18 through the lever arrangement previously described. The tube ends thus move toward each other over an arcuate path having the pivot 17, 18 as a cutter, and for this reason there is substantially no distortion of the bag as a result of the splicing movement, and therefore there is no tendency for the tube ends to slip or be displaced in the clamping jaws. This operation should be performed quickly, before the heated tube surface has had an opportunity to cool appreciably. Preferably the elapsed time between removal of the heater and butting of the tube surfaces together should be less than two seconds, and most preferably only about one second. If too great a time elapses between removal of the heater and splicing of the surfaces, the tube surfaces may cool to the extent that an inferor splice results.

Figure 11:
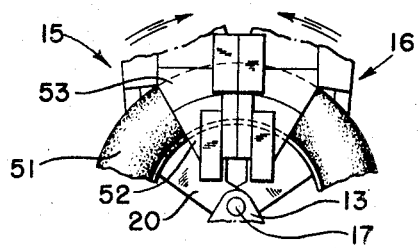
Fig. 11 is a fragmentary front elevational view of the apparatus showing the cut ends of the tube abutted together to effect a splice.

During the splice the opposing tube faces are urged together with moderate pressure. In conventional cold splicing, it has been considered necessary to use relatively high splicing pressures, e. g., pressures of 150 lbs. per square inch of splicing surface. Such high pressures have heretofore produced undesirable results in that they led to excessive flow of the stock, causing bulges to be formed at the splice, and they were apt to occasion slipping of the ends of the bag in the clamping jaws, with consequent loss of pressure to the extent that an unsatisfactory splice was formed. The present method of heating the surfaces prior to splicing obviates the need for such high splicing pressure and permits formation of excellent splices at moderate pressures, say pressures of the order of 30 lbs. per square inch of splicing surface. Splicing pressures of this order are obtained when the cut ends of the tube project from the clamping jaw faces by a distance of from ⅛ inch to 5/16 inch, and preferably ¼ inch. With the usual butyl curing bag stocks, a sharp decrease in splice quality results if the tube extension from the face of the jaw is appreciably less than ⅛ inch, due to the fact that insufficient pressure is developed at the splicing surfaces. Similarly, a marked decrease in splice quality results if the tube extension appreciably exceeds 5/16 inch, due to the fact that the resulting increased splicing pressure tends to distort the section of the bag adjacent the splice, and to form an objectionable bulge on the interior of the tube at the splice. The stated distances assume that the faces of the clamping jaws are brought into actual contact with each other at the time of the splice as indicated in Fig. 11. If the jaws are not brought into actual contact, but are spaced slightly from each other at the time of the splice, it will of course be appropriate to increase the projecting distances of the tube ends accordingly, to develop the desired splicing pressure.

The end faces of the tube are maintained in butted relationship for a sufficient period of time to become firmly knit. Usually at least 10 or 15 seconds are required for initial firm union of the tube ends, and the tube is preferably maintained in the splicer for a minimum time of 1 minute, after which the clamping jaws may be opened and the spliced tube may be removed. The splice is weak when it is new, and therefore the curing bag should not be handled or distorted for some time after the splicing operation. Preferably the freshly spliced bag is laid on a flat horizontal surface to "age" for at least two hours. There is a sharp rise in the strength of the splice until approximately 2 hours after it is made. After that, the increase is less noticeable, but still of a definite value. In order to obtain the greatest advantage of this aging, the bag should not be cured for at least 12 hours after it is spliced.

While the invention has been described in detail with particular reference to the manufacture of curing bags, it will be understood that the invention is also applicable to butt splicing of inner tubes. The step of preparing the tube surfaces for butt splicing by subjecting the surfaces to be spliced to the action of intense radiant heating as described has been found to result in quality improvements when making inner tubes from butyl rubber stock. For example, the method of the present invention may be employed when splicing inner tubes by the method disclosed in the application of Iknayan et al., Serial No. 43,974, filed August 13, 1948, now U. S. Patent No. 2,550,566.

In the Iknayan et al. method the inner tube ends to be spliced are clamped in a flat condition by suitable clamping jaws and the ends of the tube are cut off flush with the surface of the jaws, whereupon sufficient pressure is exerted on the clamping jaws to cause the tube ends to bulge outwardly from the faces of the jaws. A radiant heating element may be interposed between the end surfaces of the cut tube in close proximity thereto as described above in connection with the manufacture of curing bags, to raise the bulged-out end surfaces of the tube to an elevated temperature before they are brought together for the splice.

From the foregoing it is evident that the invention provides an apparatus for splicing curing bags and the like in which the ends of the tube to be spliced are accurately brought together in proper register without distortion of the tube, even though the tube may have very thick, relatively rigid walls, by reason of the fact that the clamping members that hold the tube ends are moved together over an arcuate path substantially concentric with the rim diameter of the tube. This is an important advantage of the present apparatus over the machines formerly used for butt splicing of curing bags, because the usual curing bag has an inherent rigidity or stiffness and, if it is attempted to bring the bag ends together on a straight line, rather than in the arcuate path described, the bag ends resist being straightened out and sometimes tend to assume a distorted position and slip within the clamping jaws, preventing a proper splice.

The present splicing method substantially eliminates the bulge which is frequently formed on the interior of the curing bag wall in conventional splicing methods, wherein the splicing surfaces are not heated to an elevated temperature, as described, prior to the splice. Because of the absence of any appreciable bulge in bags made by the present method, heat transfer through the bag is uniform throughout the bag, and more uniform vulcanization of pneumatic tires can be effected in a minimum time in the vulcanizer. Also, elimination of the bulge does away with thinned out areas, or weak spots, which are usually found adjacent to the bulge.

The elimination of the bulge by the present method of heating the surface prior to the splice is mainly a consequence of the fact that splicing can be accomplished at such moderate pressures, compared to the pressures required in conventional splicing operations. With the moderate splicing pressure made possible by the present invention there is insufficient deformation of the bag at its ends to set up stresses which would cause permanent deformation. As the clamping jaws come together in closed position for the splice, the projecting stock is deflected inwardly somewhat within the jaws, but when the jaws are released, the rubber returns substantially to its original shape, because, as stated above, there is no permanent deformation.

Because the splicing pressure may be moderate, the clamping jaws need exert only moderate pressure on the bag ends in order to keep them from slipping during the splice, and this fact in itself greatly decreases any tendency for deformation of the bag ends.

The use of radiant heat as described to bring the splicing surfaces to a receptive condition for the splice is particularly advantageous because it makes it possible to heat the end surfaces only. If the entire bag were heated at its ends, it would be difficult to hold the ends of the bag by the clamps, due to the loss of stiffness and rigidity in the bag ends. Also, heating of the under-surface or body of the bag ends would tend to result in objectionable flow or permanent deformation of the stock during the splice, producing the undesirable bulge. A further advantage of the radiant heating is that the heater does not become contaminated by contact with the rubber stock, since it is spaced therefrom.

Having thus described my invention, what I claim and desire to protect by Letters Patent is:

1. A method of splicing raw vulcanizable rubber tubes comprising the steps of clamping the ends of a tube to be spliced in opposing spaced relation with excess portions of the tube projecting outwardly, making an initial cut on such ends to remove the bulk of the projecting portions, making a subsequent very thin cut to provide smooth, even end faces on the tube, subsequently subjecting the cut end faces to the action of intense radiant heating by bringing a heated surface into close proximity to said faces, but not into actual physical contact with said faces, for a period of time sufficient to bring such end faces to a soft state without appreciable heating of the undersurface of the tube, and then removing said heated surface and immediately thereafter bringing the heated end faces of the tube together in pressurized contact, and maintaining said faces together until they are united.

2. In a method of splicing raw vulcanizable butyl rubber tubes in which freshly cut ends of the tube are butted together in pressurized contact to form a splice, the improvement comprising the steps of exposing the freshly cut surfaces to intense radiant heating for a period of time sufficient to soften the outer surfaces only of the tube without appreciable softening of the undersurfaces of the tube, and immediately thereafter bringing the heated surfaces together to effect a splice.

3. In a method of splicing curing bags having relatively thick walls including the steps of clamping a tube from which the bag is to be formed with excess end portions projecting outwardly, cutting off the projecting ends to provide freshly cut surfaces and butting the freshly cut surfaces together to form a splice, the improvement which comprises making an initial cut to remove the bulk of said projecting end portions, thereafter making a subsequent very thin cut to provide smooth even end faces on the tube, and bringing said faces together in pressurized contact to unite said faces.

4. A method of splicing raw vulcanizable butyl rubber curing bags comprising the steps of clamping the ends of a tube from which the curing bag is to be formed in opposing spaced relation with excess portions of the tube projecting outwardly, making a first relatively thick cut on such ends to remove the bulk of the excess portions, making a subsequent fine cut to provide smooth, even surfaces on the ends of the tube, bringing a radiant heater into closely spaced relation to the end surfaces of the tube to heat said surfaces to a temperature within the range from 325° to 450° F., and thereafter bringing the heated surfaces together under pressure to effect a butt splice.

5. In a method of splicing raw vulcanizable butyl rubber tubes in which freshly cut ends of the tube are butted together in pressurized contact to effect a splice, the improvement comprising the steps of placing a radiant heat source having a surface temperature within the range of from 800° to 1300° F. in spaced relation to said faces a distance of less than $\frac{5}{16}$ inch away from said faces, for a time period of less than 15 seconds, and thereafter bringing the thus heated surfaces together to form a splice.

6. In a method of splicing raw vulcanizable butyl rubber tubes in which freshly cut ends of the tube are butted together in pressurized contact to effect a splice, the improvement comprising the steps of radiantly heating the surfaces only of the freshly cut ends of the tube to a temperature within the range of 325° to 450° F., and thereafter butt splicing the heated surfaces.

7. A method of splicing raw vulcanizable rubber tubes comprising the steps of clamping the ends of a tube to be spliced in opposing spaced relation with excess portions of the tube projecting outwardly, making a first relatively thick cut on such end with a heated knife to remove the bulk of the excess portions, making a subsequent fine cut of approximately $\frac{1}{16}$ inch thickness with a hot knife to provide smooth even surfaces on the ends of the tube, bringing a radiant heater to within ¼ inch of the ends of the tube, said heater having a surface temperature within the range of from 800° to 1300° F., said heater being maintained in position in spaced relation to the end surfaces of the tube for a period of time only sufficient to raise the surfaces of the tube to a temperature within the range from 325° to 450° F., and immediately thereafter butt splicing the heated surfaces together.

8. In a method of splicing raw vulcanizable butyl rubber tubes in which freshly cut ends of the tube are butted together in pressurized contact to effect a splice, the improvement comprising the steps of disposing a radiant heating surface parallel to said ends, and in closely spaced relation thereto, said radiant heating surface having a temperature sufficient to raise the entire surface area of said ends to a uniformly elevated temperature of at least 325° F. in less than 10 seconds, and immediately thereafter pressing said ends together to splice the tube.

9. In a method of splicing raw vulcanizable butyl rubber tubes in which the ends of a tube to be spliced are cut with a hot knife and then butted together in pressurized contact to effect a splice, the improvement comprising the steps of disposing a radiant heating surface parallel to said cut ends in closely spaced relation thereto, to raise the entire surface area of said ends to a uniformly elevated temperature in which the butyl rubber is in a soft, receptive state, said radiant heating surface having a sufficiently elevated temperature to raise the end surfaces of the tube to said uniformly elevated temperature in a relatively brief period of time, whereby the said end surfaces are brought to said uniformly elevated temperature without appreciable softening of the areas of the tube adjacent said end surfaces, and immediately thereafter butting the end surfaces together to form a splice.

10. In a method of splicing raw vulcanizable butyl rubber tubes including the steps of cutting the ends of a tube and pressing the freshly cut ends together to effect a splice, the improvement which comprises the step of heating said ends to an elevated temperature subsequent to said cut and prior to said splice, and bringing the heated ends together at a temperature of at least 250° F. to make the splice.

11. An apparatus for butt splicing tubes of raw vulcanizable rubber stock comprising in combination a pair of oppositely disposed jaws for clamping the ends of a tube to be spliced with portions of said ends projecting outwardly from said jaws, means for making a first cut to remove the bulk of the projecting end portions of said tube, means for making a second cut spaced slightly closer to said jaws to remove only a thin slice of said projecting end portions, a radiant heating means interposable between said jaws in closely spaced proximity to the cut end surfaces of the tube, and means for bringing said jaws together to butt splice the cut and heated end surfaces of the tube.

12. An apparatus for butt splicing curing bags of raw vulcanizable butyl rubber stock comprising in combination a pair of oppositely disposed jaws for clamping the ends of a tube to be spliced to form a curing bag with portions of said ends projecting outwardly from said jaws, means for making a first cut to remove the bulk of the projecting end portions of said tube, means for making a second cut spaced slightly closer to said jaws to remove only a thin slice of said projecting end portions, and means for bringing said jaws together to butt splice the cut end surfaces of the tube.

13. In an apparatus for butt splicing raw vulcanizable rubber tubes comprising in combination means for clamping the ends of a tube to be spliced in oppositely disposed relation, means for cutting off the end surface of the tube, and means for bringing the said clamping means together to effect a butt splice of the freshly cut end surfaces, the improvement which comprises a radiant heater mounted for movement into and out of the position between the cut end surfaces of the tube with the surfaces of the heater in closely spaced relation to said cut end surfaces.

14. An apparatus for butt splicing raw vulcanizable rubber tubes comprising in combination a pair of jaws for clamping the ends of the tube to be spliced in oppositely disposed relation with the end portions of the tube projecting outwardly from said jaws, a rotary cutter mounted adjacent each of said jaws, each cutter having a hub plate with two heated knives mounted along opposite portions of the periphery of said hub plate, means for rotating said hub plate across the face of the jaw to cut off the bulk of the projecting portion of an end of the tube with one of said heated knives, means for tilting said hub plate at the conclusion of said cut to bring the other of said heated knives slightly closer to the clamping jaw, means for rotating the hub plate in the opposite direction across said jaw to cut a thin slice from the projecting end of the tube, and means for bringing the ends of the tube together to effect a butt splice.

15. An apparatus for butt splicing raw vulcanizable rubber tubes comprising in combination a pair of jaws for clamping the ends of a tube to be spliced in oppositely disposed relation with the end portions of the tube projecting outwardly from said jaws, a cutting means mounted adjacent each of said jaws for movement across the faces of said jaws to remove the bulk of the projecting end portions of the tube, further cutting means mounted for subsequent movement across the faces of said jaws and spaced slightly closer to said jaws to remove a thin slice from said projecting ends, and means for bringing the cut end surfaces of the tube together to effect a butt splice.

16. An apparatus for butt splicing raw vulcanizable rubber tubes comprising in combination a pair of jaws for clamping the ends of a tube to be spliced in oppositely disposed relation with end portions of the tube projecting outwardly from said jaws, a cutting means mounted adjacent to each of said jaws for movement across the faces of said jaws to remove the bulk of the projecting end portions of the tube, means for displacing said cutting means slightly towards the jaw at the conclusion of a cutting movement, whereby a subsequent cutting movement removes only a thin slice of material from the end surfaces of the tube, and means for butting the end surfaces of the tube together to effect a splice.

17. An apparatus for butt splicing a raw vulcanizable butyl rubber curing bag comprising a pair of swinging arms pivotally joined at their bases, a pair of oppositely disposed arcuately spaced clamping jaws mounted on said arms for holding a tube to be spliced so that the length of the tube is in the form of a circle having said pivotal joint as a center, the ends of the tube being held generally circular in cross section in said jaws and the ends of the tube projecting outwardly from the faces of said jaws, actuating cylinders mounted on said arms for opening and closing said jaws for insertion and removal of the tube, cutters mounted on said arms adjacent each of said jaws for cutting off the projecting portions of the ends of the tube, further actuating cylinders mounted on said arms for operating said cutters, and pivotally linked levers extending from said arms to a further actuating cylinder for swinging said arms together about said pivotal joint to splice the cut end surfaces of the tube together.

DORR J. HINMAN.

References Cited in the file of this patent

UNITED STATES PATENTS

| Number | Name | Date |
| --- | --- | --- |
| 2,024,578 | Haase | Dec. 17, 1935 |
| 2,273,463 | Campbell et al. | Feb. 17, 1942 |
| 2,468,629 | Herzig et al. | Apr. 26, 1949 |
| 2,480,794 | Waggoner | Aug. 30, 1949 |
| 2,510,715 | Peterson et al. | June 6, 1950 |
| 2,541,696 | George | Feb. 13, 1951 |
| 2,546,085 | Briscoe et al. | Mar. 20, 1951 |
| 2,565,703 | Strong | Aug. 28, 1951 |